US007024291B2

(12) United States Patent
Sudou

(10) Patent No.: US 7,024,291 B2

(45) Date of Patent: Apr. 4, 2006

(54) MAINTENANCE SCHEDULING APPARATUS AND METHOD THEREFOR

(75) Inventor: Tsugio Sudou, Tokyo (JP)

(73) Assignee: Komatsu Ltd., Tokyo (JP)

( * ) Notice: Subject to any disclaimer, the term of this patent is extended or adjusted under 35 U.S.C. 154(b) by 43 days.

(21) Appl. No.: 10/725,507

(22) Filed: Dec. 3, 2003

(65) Prior Publication Data

US 2004/0143377 A1 Jul. 22, 2004

(30) Foreign Application Priority Data

Dec. 4, 2002 (JP) ............................ 2002-352050

(51) Int. Cl.
*G06F 19/00* (2006.01)

(52) U.S. Cl. .......................... 701/30; 701/29; 340/438; 340/457.04

(58) Field of Classification Search .................. 701/29, 701/30, 32, 33, 35; 340/438, 439, 457, 457.4
See application file for complete search history.

(56) References Cited

U.S. PATENT DOCUMENTS

| | | | | |
|---|---|---|---|---|
| 6,505,106 | B1 * | 1/2003 | Lawrence et al. | 701/35 |
| 6,643,571 | B1 * | 11/2003 | Gotvall et al. | 701/33 |
| 6,677,854 | B1 * | 1/2004 | Dix | 340/438 |
| 6,847,872 | B1 * | 1/2005 | Bodin et al. | 701/33 |
| 2002/0016655 | A1 * | 2/2002 | Joao | 701/35 |
| 2003/0065771 | A1 * | 4/2003 | Cramer et al. | 709/224 |
| 2003/0195676 | A1 * | 10/2003 | Kelley et al. | 701/29 |
| 2004/0085198 | A1 * | 5/2004 | Saito et al. | 340/438 |
| 2004/0093134 | A1 * | 5/2004 | Barber et al. | 701/29 |

FOREIGN PATENT DOCUMENTS

| | | |
|---|---|---|
| JP | 5-272983 | 10/1993 |

* cited by examiner

*Primary Examiner*—Gary Chin
(74) *Attorney, Agent, or Firm*—Posz Law Group, PLC; R. Eugene Varndell, Jr.

(57) ABSTRACT

A running control unit receives fuel residual quantity information from each vehicle by radio to deduce a period of time, during which the vehicle can operate, on the basis of the information and vehicle fuel consumption rate information in a database. Also, the running control unit reads production information, production planning information, and oil station information from a data base to calculate are fueling permissible number, for which refueling may be done simultaneously at the oil station, on the basis of these information and information of the number of the vehicles. Then the running control unit makes up refueling schedules for a plurality of vehicles on the basis of an operating period of time for each vehicle and the refueling permissible number.

11 Claims, 6 Drawing Sheets

MAINTENANCE SCHEDULING APPARATUS AND METHOD THEREFOR

BACKGROUND OF THE INVENTION

1. Field of the Invention

The present invention relates to a technique of making use of a computer to make up maintenance schedules for a plurality of vehicles.

2. Description of Related Art

Maintenance of vehicles includes, for example, appropriate refueling in a manner to eliminate gas shortage in running. A technique for appropriate refueling includes, for example, an on-board navigation apparatus described in JP-A-5-272983. The apparatus comprises a fuel sensor for detecting a fuel residual quantity, and when a detection value in the fuel sensor is disregarded and it is detected that a detection value (that is, a fuel residual quantity) becomes a predetermined value or less, a minimum path up to a nearest oil station is displayed on a display device.

[Patent Document 1]

JP-A-5-272983 (paragraphs 25 to 34, FIGS. 3 and 4)

In the case where the above technique is applied to, for example, an automatic operating system for a plurality of vehicles for conveying a load such as minerals and so on, the respective vehicles can be made free from gas shortage. In the above conventional technique, however, only a path to an oil station for each vehicle is displayed according to a fuel residual quantity in the vehicle, so that there is a possibility that more vehicles than a predetermined number of vehicles arrive simultaneously at the same oil station. Ordinarily, an oil station can refuel a predetermined number of vehicles at the same time, so that when vehicles not less than the predetermined number of vehicles arrive at the same time, a wasteful waiting time is generated and productivity is decreased.

Such problem is not limited to refueling but possible in other maintenance. That is, productivity is decreased in the case where running is suspended because of simultaneous maintenance for a predetermined number of vehicles or more. In this manner, the problem that productivity cannot be maintained is especially serious, for example, in the case where it is desired that an appropriate production conformed to a disposition capacity of a crusher be maintained in a mining site involving conveyance of minerals or the like by periodically conveying broken stone successively produced according to the disposition by the crusher.

SUMMARY OF THE INVENTION

Accordingly, it is an object of the invention to make up maintenance schedules for a plurality of vehicles, by which maintenance of the plurality of vehicles is efficiently done and a predetermined productivity can be maintained.

In the following paragraphs, numerals in parentheses illustrate correspondence between them and elements shown in the accompanying drawings, but this is only illustrative for the sake of explanation and not intended for limitation on a technical scope of the invention.

An apparatus according to the invention is one for making up maintenance schedules for a plurality of vehicles (15), and comprises detection means (73) for detecting operating situations and/or vehicular states of the plurality of vehicles (15), and scheduling means (73) for making up maintenance schedules for the plurality of vehicles (15) on the basis of the detected operating situations and/or vehicular states to prevent more vehicles (15) than a predetermined number of vehicles from being suspended in operation at the same time (for example, each of the plurality of vehicles (15) runs so as not to suffer fuel shortage).

In addition, "maintenance" referred to in the specification of the present application may include a passive maintenance being a simple stop, not to mention a positive maintenance such as refueling, part replacement, or the like.

Also, "making up a maintenance schedule" referred to here may include, for example, at least one of (1) simply making up a maintenance schedule, and (2) determining a timing, at which contents of a command for maintenance (for example, when or from where running to a spot for maintenance should be done) and/or the command for maintenance is transmitted to each vehicle.

In a preferred embodiment, position storage means (13) is further provided for storing positional information of maintenance locations where maintenance for the vehicles (15) is done, the detection means 53 detects respective present locations of and consumption or residual quantities of a fuel in the plurality of vehicles (15), and the scheduling means (73) makes up the maintenance schedules on the basis of the positional information of maintenance locations stored in the storage means, the detected present locations of and consumption or residual quantity of a fuel in the respective vehicles (15).

In a preferred embodiment, the scheduling means (73) makes up maintenance schedule for a second vehicle (15) on the basis of at least one of the following (1) and (2), that is, (1) an operating situation and/or a vehicular state of one or more first vehicles (15), and (2) respective maintenance schedules of the one or more first vehicles (15) determined previously on the basis of (1), and an operating situation and/or a vehicular state of the second vehicle (15).

In a preferred embodiment, production storage means (13) is further provided for storing production information representative of the relationship between operating information with respect to operation of at least one of the plurality of vehicles (15) and production, and production planning information represented with the use of production, and wherein the scheduling means (73) makes up the maintenance schedules on the basis of the production information stored and the production planning information in the production storage means (13) in addition to the detected operating situations and/or vehicular states.

Here, "production information" concretely indicates production of, for example, a predetermined number of vehicles per a predetermined period of time. Taking the case where the system according to the invention is made use of for conveyance in mining in a mining site such as mine and so on, "production information" is one prescribed by, for example, the following information, that is, (1) information relating to a device for loading broken stone on a vehicle (for example, a performance of the device, an example of which is afforded by the loading capacity per a predetermined period of time (for example, a quantity of broken stone that can be loaded per a predetermined period of time)), (2) information relating to productivity of vehicles (for example, a quantity of broken stone that can be loaded per a predetermined period of time and per a predetermined distance of conveyance), and (3) the number of vehicles and the number of loading devices.

Also, "production planning information" may be one (for example, information represented by graphs or tables) indicative of, for example, the relationship between a predetermined period of time (for example, a predetermined point of time or a predetermined time zone) and production, or a total production aimed at.

The above respective means may be provided on vehicles.

Also, at least scheduling means among a plurality of means, which constitute the system according to the invention, can be carried out by means of a computer, and a computer program therefor can be installed or loaded in a computer through various media such as disk type storage, semiconductor memory, communication network, or the like.

DESCRIPTION OF THE PREFERRED EMBODIMENTS

Figure 1:
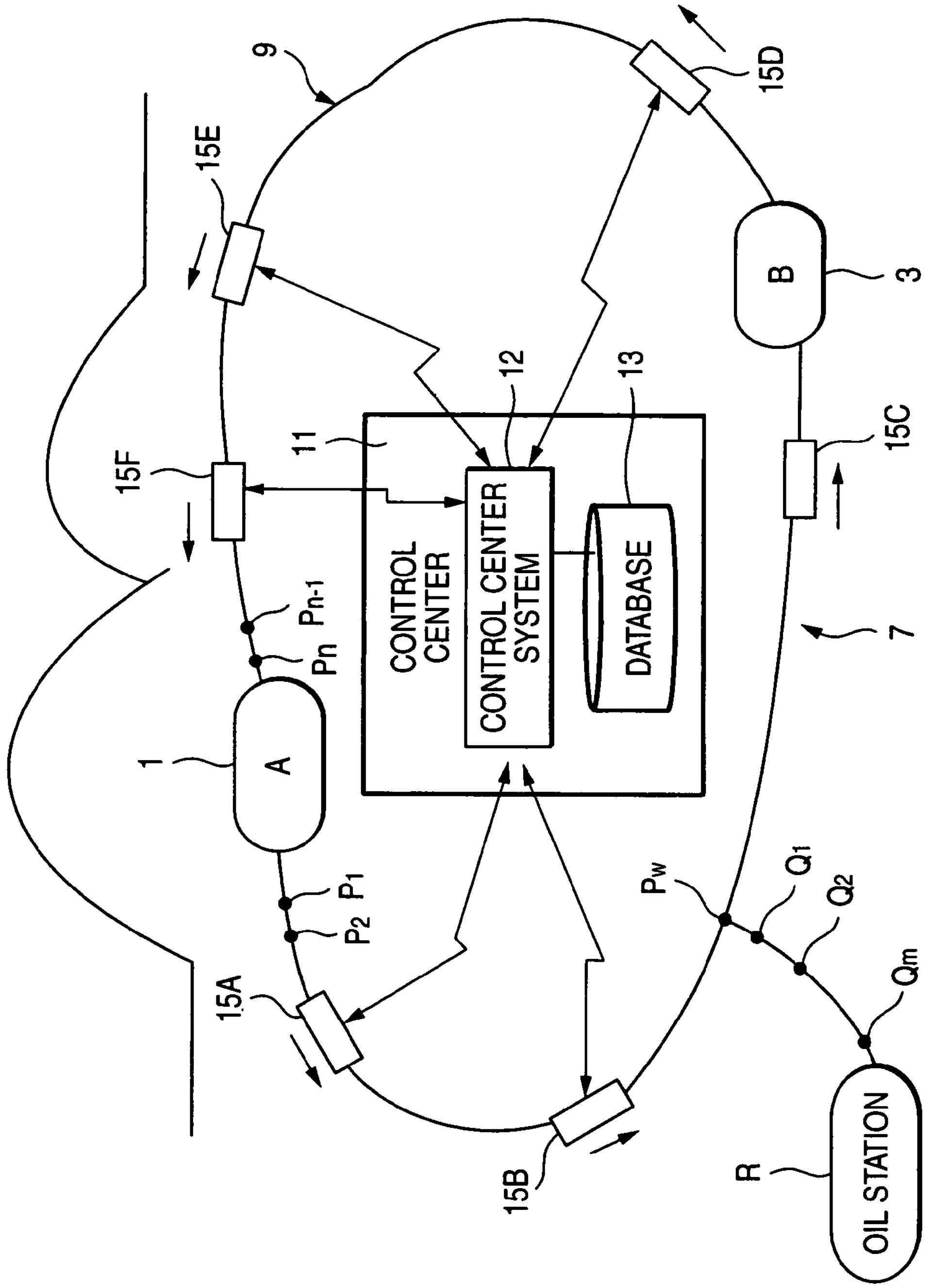
FIG. 1 is a view generally showing a system according to an embodiment of the invention.

FIG. 1 shows an example of an automatic vehicle conveyance system, to which a scheduling apparatus according to an embodiment of the invention is applied.

The system makes use of, for example, an automatic running technology of vehicles to convey broken stone mined in a mine. With the system, a plurality (for example, six) of same or different vehicles 15A to 15F and a control center 11 for controlling the respective vehicles 15A to 15F are prepared, and the respective vehicles 15A to 15F under the control by the control center 11 automatically convey minerals (broken stone), which have been mined around a site A1, to a site B3 via a first course 7 and pass along a second course 9 from the site B3 to return to the site A1 to take minerals. Also, with the system, each vehicle 15 (referred below to when any one of the vehicles is indicated) can run to an oil station R from a spot $P_w$ on the first course in accordance with a command from the control center 11 to receive oil.

Provided in the control center 11 are a database 13 for accumulation of various data, and a computer system (referred below to as a control center system) 12 for controlling the respective vehicles 15A to 15F (the database 13 and the control center system 12 may be installed in separate buildings provided that the both can communicate with each other). Stored in the database 13 is target running control information (the target running control information is described later) containing target course data, in which predetermined courses 7, 9 are represented by a multiplicity of coordinates $P_1$ to $P_n$ and a course extending from a coordinate $P_w$ on the first course 7 to the oil station R is represented by a plurality of coordinates $Q_1$ to $Q_m$. The control center system 12 and the respective vehicles 15A to 15F can make two-way communication with each other. The control center system 12 can control running of a plurality of vehicles 15A to 15F and make up a schedule for refueling on the basis of the target running control information in the database 13 and running state information received by radio from each vehicle 15 having run on the basis of the target running control information.

The embodiment will be described below in detail with reference to FIG. 2 and the following figures.

Figure 2:
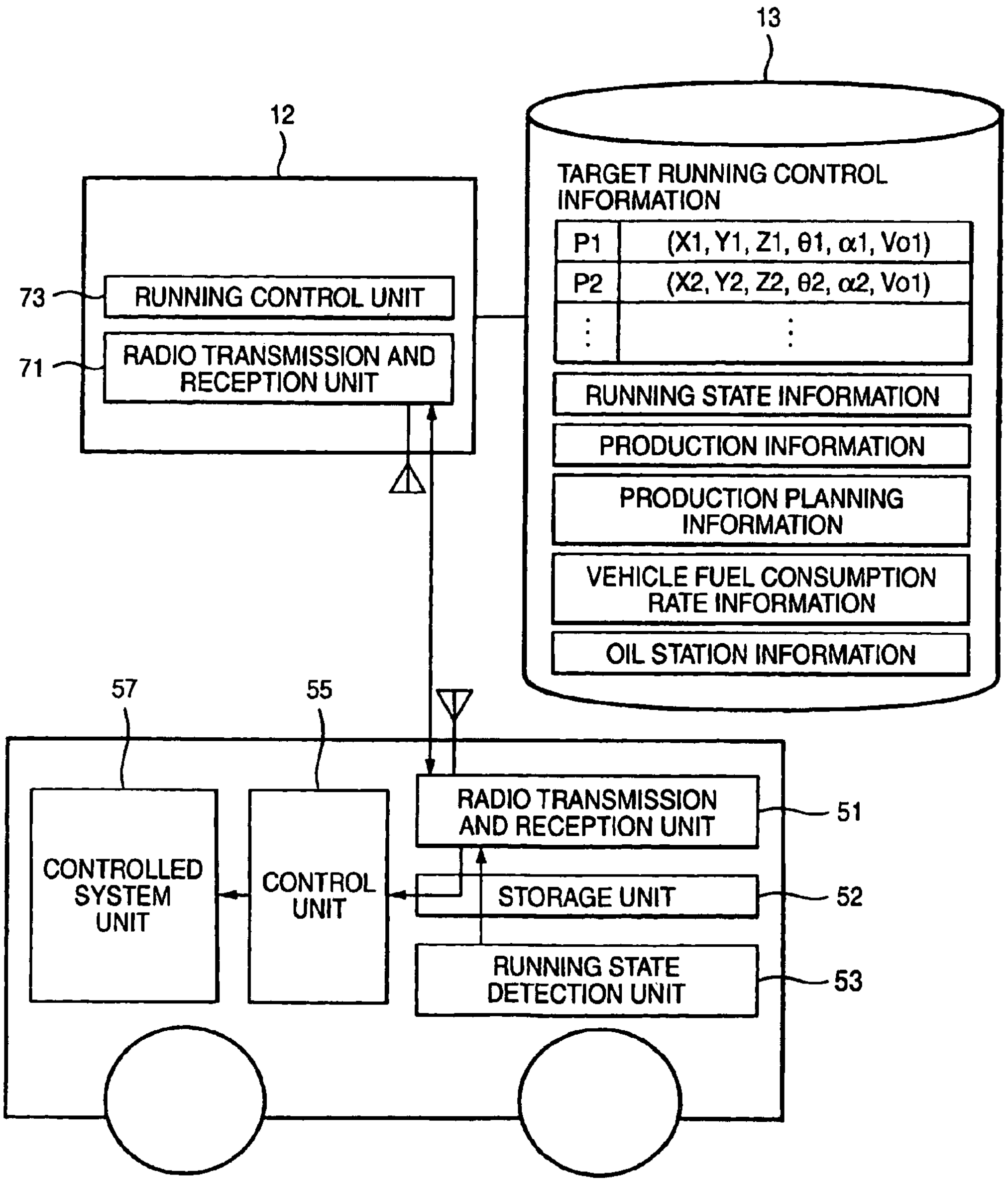
FIG. 2 is a functional block diagram of a control center system 12 and a vehicle 15.

FIG. 2 is a functional block diagram for the vehicles 15, the database 13 and the control center system 12.

The vehicles 15 comprise a running state detection unit 53, a radio transmission and reception unit 51, a storage unit 52, a control unit 55, and a controlled system unit 57.

The running state detection unit 53 has a function of detecting information (referred simply to as "running state information") regarding an operating situation and/or a running state of the vehicles 15, for example, a function of detecting a present position (for example, a GPS apparatus for receiving a GPS signal to detect a latitude, longitude and an altitude of a spot where an associated vehicle is located), a function of detecting an operating period of time and/or a running distance from a first point of time (for example, a predetermined point of time in the past) to a second point of time (for example, a present point of time), a function of detecting (an apparatus for detection with the use of a gyroscope) yaw (sense in a horizontal direction, for example, orientation) and/or pitch (an inclination in a vertical direction, in other words, a gradient of a road surface). Also, the running state detection unit 53 comprises means for detecting, for example, consumption or residual quantity of a fuel, a function of detecting a weight (load) of a load such as minerals or the like loaded on an associated vehicle, a function of detecting slip or wheel lock of a tire (for example, a detecting function making use of a sensor for detecting a rotational speed of a tire), and a function of detecting a present running speed. In addition, a load is detected at a predetermined timing (for example, at least one of optionally, periodically, when the load is taken down, or when a load is taken on).

The radio transmission and reception unit 51 receives target running control information from the control center system 12 by radio to store the same in the storage unit 52 such as memory or the like and transmits a running state detected by the running state detection unit 53 (for example, a present position (for example, a latitude, longitude and an altitude), speed, consumption or residual quantity of a fuel, an operating period of time and/or a running distance, existence and nonexistence of slip or wheel lock of a tire, and a load) to the control center system 12 by radio.

The control unit 55 comprises a computer (for example, a computer for performing PID control) to acquire that target running control information, which is received by the radio transmission and reception unit 51 and stored in the storage unit 52, from the control center system 12 and on the basis of the acquired target running control information to calculate and determine a controlled variable to the controlled system unit 57 with the use of a predetermined algorithm to control the controlled system unit 57 on the basis of a determined controlled variable so that running is made to match the target running control information as much as possible. Here, the controlled system unit 57 comprises at least one of a plurality of units controlled by the control unit 55, which include a brake solenoid, a choke solenoid, a steering actuator, a brake actuator, a throttle actuator, an accelerator, a brake, a steering, a transmission, and so on.

The following data are registered in the database 13.

(1) Target Running Control Information

The target running control information relates to contents, such as that position, at which, that direction (sense), in which, and that speed, at which the respective vehicles 15A to 15F should run, of running aimed at by the respective vehicles 15A to 15F. Concretely, the target running control information includes, for example, data of a target course, along which running should be done, data of a target yaw indicative of a sense, in which running should be done at each of a plurality of spots (referred below to as "target spot") on the target course, and data indicative of a target speed at the time of passage through the respective target spots. The data of a target course are represented by a multiplicity of coordinates $P_1$ to $P_n$ (for example, a latitude, a longitude and an altitude) indicative of a multiplicity of target spots on the target course and a plurality of coordinates $Q_1$ to $Q_m$ indicative of a course between a spot $P_w$ on the first course 7 and the oil station R, and the target running control information containing such information constitutes, for example, a table, on which a latitude (X), a longitude (Y), an altitude (Z), a pitch ($\alpha$), a target yaw ($\theta$), and a target speed ($v_o$), respectively, corresponding to a multiplicity of coordinates $P_1$ to $P_n$ and $Q_1$ to $Q_m$ are recorded. In addition, the target course data may comprise another data structure, for example, (a) vector data, (b) two or more groups, into which the multiplicity of coordinates $P_1$ to $P_n$ and $Q_1$ to $Q_m$ are-divided (for example, target course data are transmitted in each group unit from the control center system 12), (c) polygon data fabricated on the basis of a width of a target course, and so on.

Also, the target running control information may comprise one manually input by a human, or one obtained as the result of a human operating at least a vehicle to have the same running in a predetermined course at least once and automatically input from the vehicle. (in the case where running is done several times, average information of running state information, for example, several times will do).

(2) Running State Information

Running state information is one received from each vehicle 15 and one indicative of running states of each vehicle 15 at respective spots. For example, running state information corresponding to each vehicle 15 is one including at least one of positional information of such vehicle (for example, a latitude (X), a longitude (Y), an altitude (Z), a pitch ($\alpha$)) consumption or residual quantity of a fuel, an operating period of time and/or a running distance, existence and nonexistence of slip or wheel lock, a load, and a running speed. The running state information is fabricated and transmitted by the control unit 55 of the vehicle 15 on the basis of contents of detection in the running state detection unit 53 whenever a position detected by the running state detection unit 53 is varied.

(3) Production Information

Production information is one representative of the relationship between operating information with respect to operation of at lease one vehicle 15 among a plurality of vehicles 15A to 15F and production, and concretely represents production of a predetermined number (for example, one) of vehicles per a predetermined period of time (for example, one hour). More concretely, the production information is one prescribed by, for example, the following information (a) to (c), (a) information relating to a device for loading broken stone on a vehicle (for example, information representative of the performance of the device, an example of which is afforded by information relating to the loading capacity per a predetermined period of time (for example, a quantity of broken stone that can be loaded per a predetermined period of time)),
(b) information relating to productivity of vehicles (for example, information relating to a transportation quantity of broken stone per a predetermined period of time and per a predetermined distance of conveyance), and
(c) the number of vehicles and the number of loading devices.

(4) Production Planning Information

Production planning information is one represented with the use of production, and maybe one indicative of, for example, the relationship between a predetermined period of time (for example, a predetermined moment in time or a predetermined time zone) and production, or may be a total production aimed at.

(5) Vehicle Fuel Consumption Rate Information

Vehicle fuel consumption rate information is one indicative of a fuel consumption per a predetermined operating quantity (for example, a predetermined period of time or a predetermined running distance) of each of a plurality of vehicles 15A to 15F. In addition, the fuel consumption may be recorded every load (or a total weight).

(6) Oil station information

Oil station information is one relating to the refueling capacity afforded by the oil stations R, and including, for example, the number (for example, one in the embodiment) of oil stations R as installed, positions of the respective oil stations R, the number of those oil stations R, at which refueling is simultaneously possible, a period of time required for feeding oil to one vehicle at the respective oil stations R, and so on.

The above information in (1) to (6) is stored in the database 13.

The control center system 12 comprises a radio transmission and reception unit 71 and a running control unit 73.

The radio transmission and reception unit 71 transmits the target running control information in the database 13 to each vehicle 15 by radio and receives running state information from each vehicle 15 by radio to register the same in the database 13.

The running control unit 73 comprises a computer for controlling running of each vehicle 15, the computer serving, for example, to transmit the target running control information in the database 13 to each vehicle 15 by radio through the radio transmission and reception unit 71 and to make up a schedule for refueling to each vehicle 15, on the basis of various information registered in the database 13 to transmit a command (referred below to as refueling command) to the effect that a target vehicle 15 should be refueled at a predetermined timing, via the radio transmission and reception unit 71 on the basis of the refueling schedule by radio. The running control unit 73 makes up a refueling schedule at a predetermined timing (for example, periodically or optionally) in accordance with, for example, a procedure shown in FIG. 3 to issue a refueling command to each vehicle 15.

Figure 3:
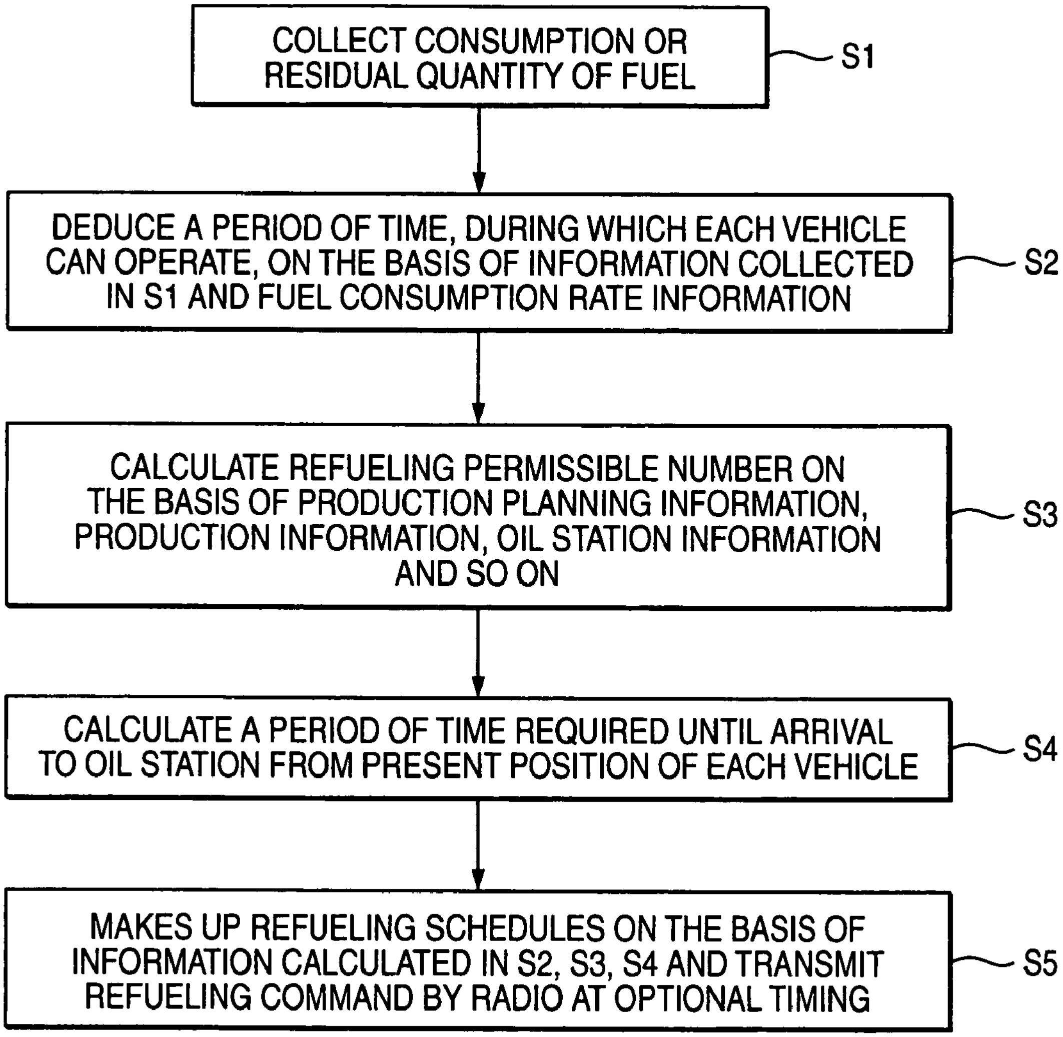
FIG. 3 is an operation flowchart of a refueling schedule in a running control unit 73.

FIG. 3 shows an operation flow chart of a refueling schedule in the running control unit 73. In addition, while the number of vehicles 15 has been described heretofore as being six, the number of vehicles 15 with vehicle ID "1" to "15" is fifteen in the following description for the purpose of convenience.

The running control unit 73 reads running state information of each vehicle 15 from the database 13 to collect consumption or residual quantity of a fuel in each vehicle 15 (STEP S1).

Figure 4:
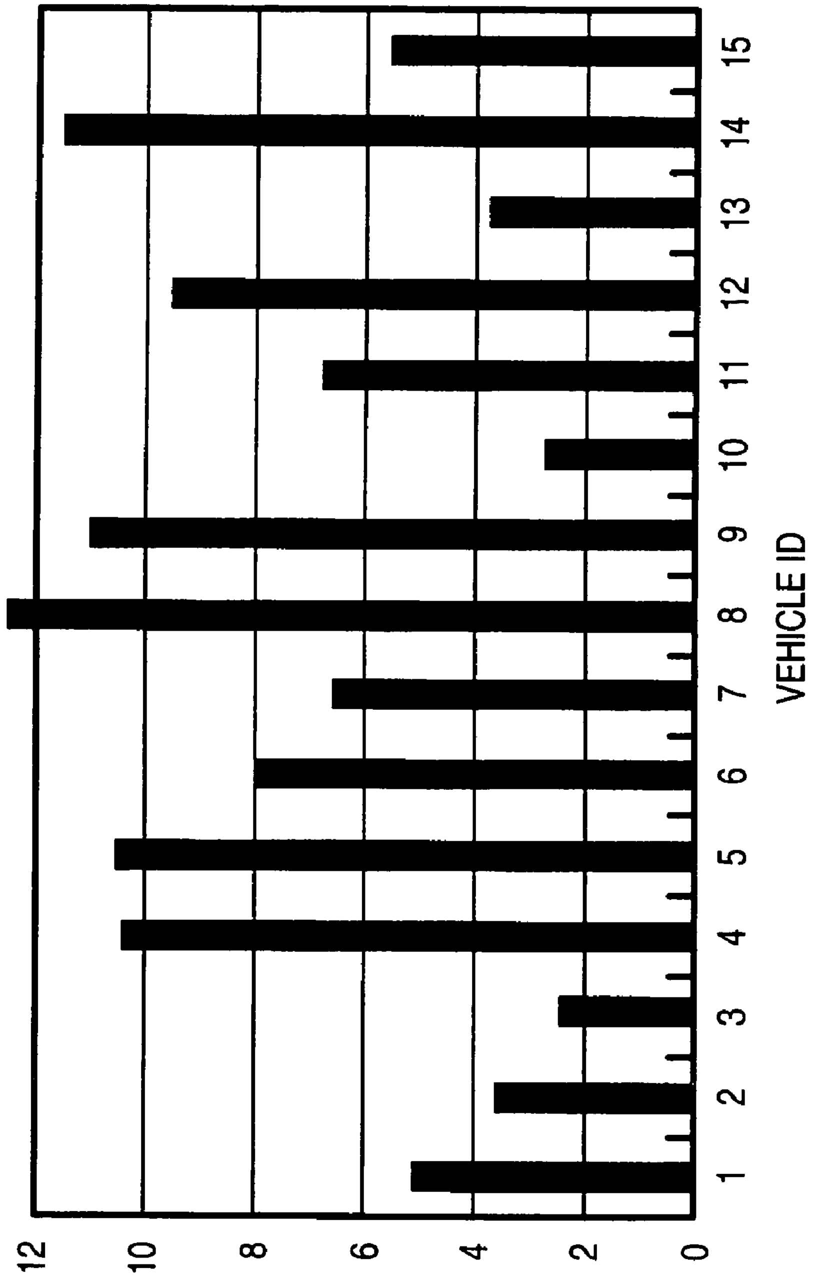
FIG. 4 is a view indicating an example of results of deduction for periods of time, during which fifteen vehicles 15 can operate.
Figure 5:
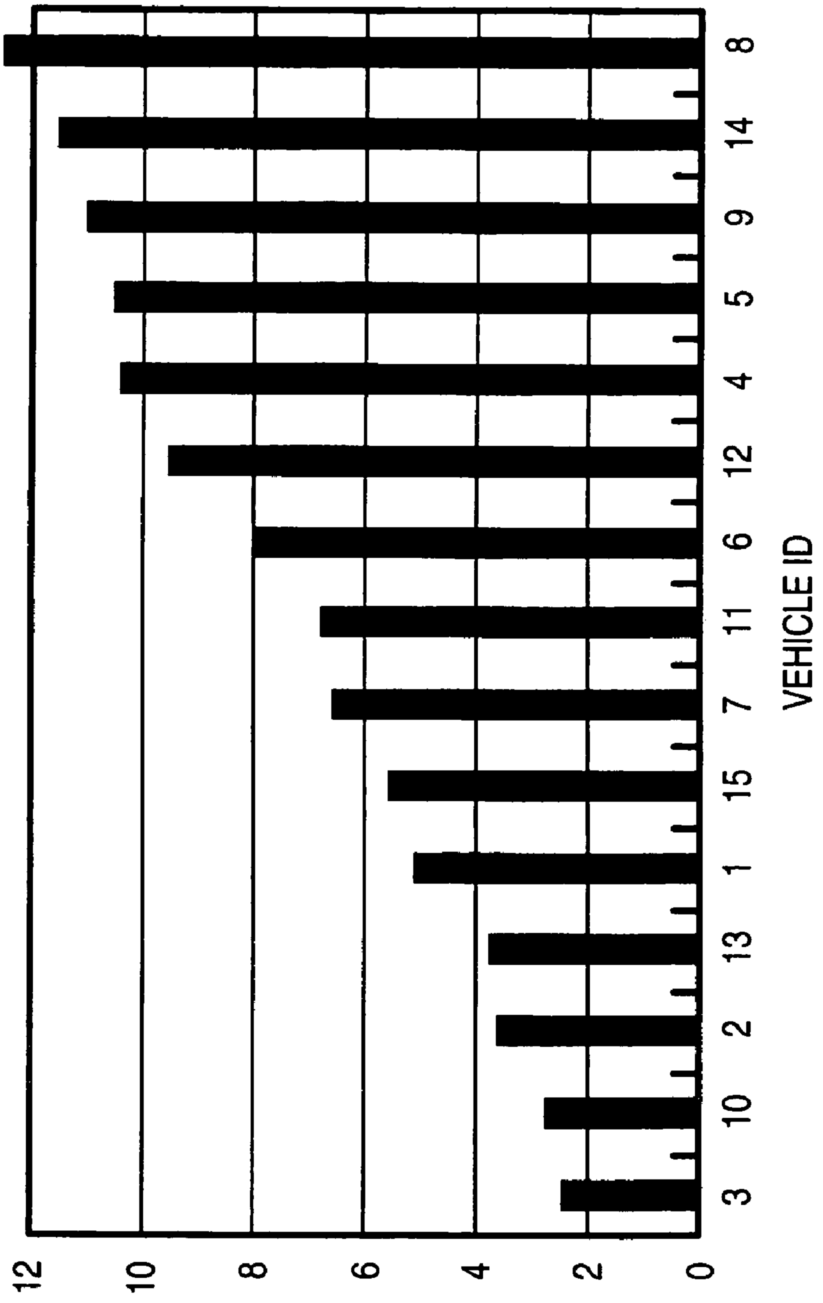
FIG. 5 is a view indicating sorting of the results of deduction of FIG. 4 in the order of decreasing time, during which operation is possible.

Subsequently, the running control unit 73 reads vehicle fuel consumption rate information from the database 13 to deduce a period of time, during which each vehicle 15 can operate, (or a distance, over which running is possible) on the basis of the vehicle fuel consumption rate information and that consumption or residual quantity of a fuel in each vehicle 15, which has been collected in S1 (S2). In addition, the running control unit 73 may find a fuel consumption rate conformed to a load on each vehicle 15 from the vehicle fuel consumption rate information to deduce a period of time, during which the vehicle 15 can operate, (or a running distance) on the basis of the rate and consumption or residual quantity of a fuel. Also, results of such deduction may be displayed to an operator of the control center system 12 as shown in, for example, FIG. 4. Also, periods of time, during which the respective vehicles can operate, (or distances, over which running is possible) in the result of the deduction may be automatically rearranged in the order of decreasing time (or increasing time), during which running is possible, in response to the operation by an operator, or at a predetermined timing as shown in, for example, FIG. 5.

Subsequently, the running control unit 73 reads production information, production planning information, and oil station information from the database 13 to calculate the number (referred below to as "refueling permissible number") of vehicles, which may be simultaneously refueled in the oil station R, on the basis of such information and information of the number of vehicles 15 (this information is registered in, for example, the database 13) (S3). The refueling permissible number calculated here makes a target number provided that, for example, the number (referred below to as "target number") required for maintaining a target production in a predetermined period of time or in the whole represented in the production planning information is not more than the number of vehicles (referred below to as "refueling reference number"), which can be simultaneously refueled in the oil station R, and makes a refueling reference number in the case where the target number is more than the refueling reference number. In addition, the refueling permissible number described above may be beforehand registered.

Subsequently, the running control unit 73 grasps a present position of each vehicle 15 from the running state information of each vehicle 15 to calculate a first period of time (or a first running distance) required until arrival to the oil station R from the present position, on the basis of the present locations, positional information of the oil station R, and a vehicle fuel consumption rate corresponding to a load on each vehicle 15 (S4). Also, at this time, for each vehicle 15, the running control unit 73 calculates a second period of time (or a second running distance) required in the case of running along the courses 7, 9 instead of going to the oil station R, on the basis of its present position, the target running control information, and the vehicle fuel consumption rate information.

And the running control unit 73 makes up refueling schedules for fifteen vehicles 15 on the basis of an operating period of time (a running distance), for each vehicle 15, calculated in S2, the refueling permissible number calculated in S3, the first period of time (or the first running distance) and the second period of time (or the second running distance) for each vehicle, calculated in S4 to transmit by radio a refueling command to an optional vehicle 15 at an optional timing on the basis of contents of the refueling schedules (S5).

Figure 6:
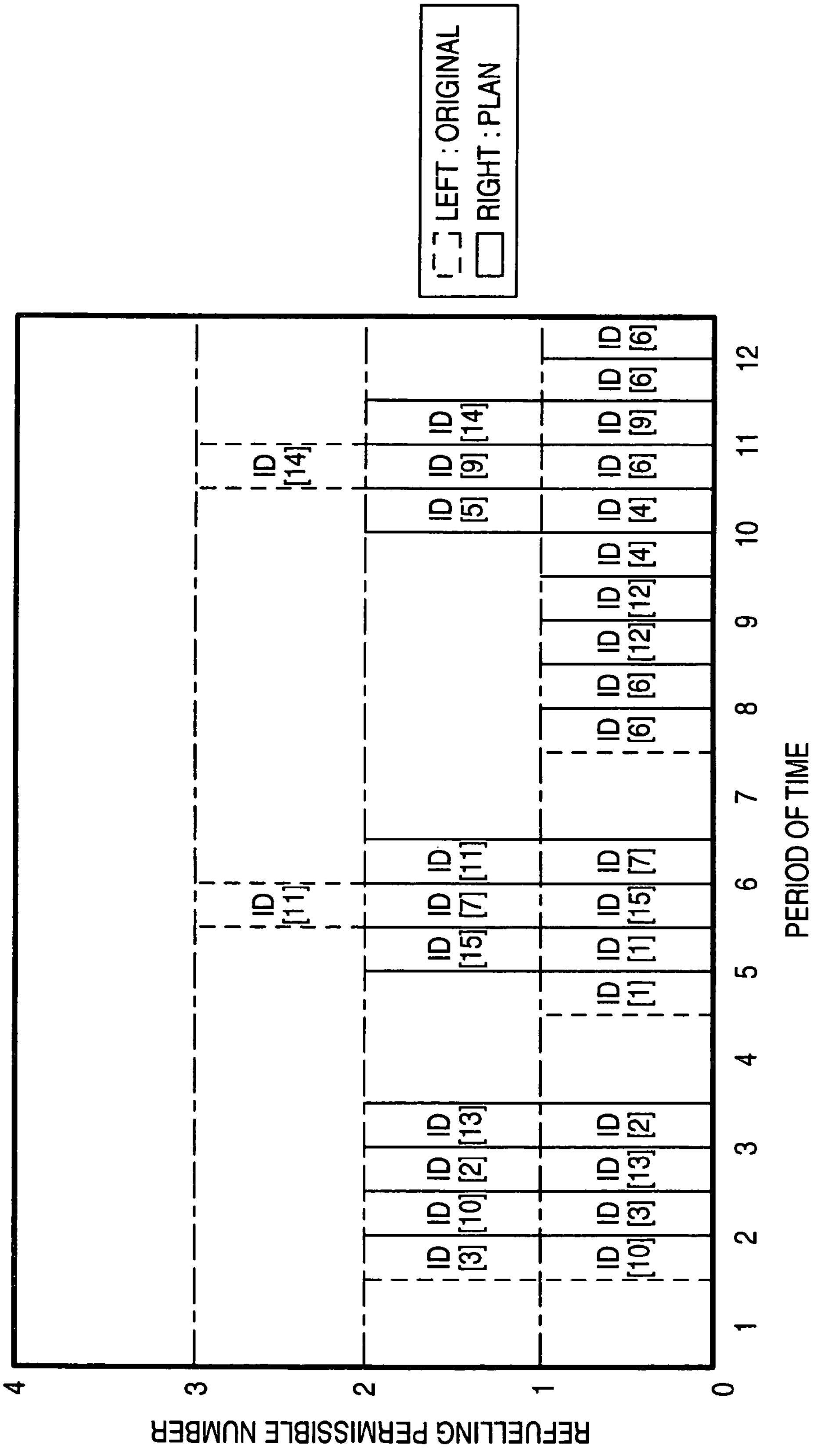
FIG. 6 is a view indicating an example of results of refueling schedules.

For example, in the case where an original refueling schedule is beforehand made up as shown in FIG. 6, the running control unit 73 modifies the original refueling schedule into a refueling schedule, by which production indicated by the production planning information is maintained as shown in FIG. 6, on the basis of an operating period of time (a running distance), for each vehicle 15, calculated in S2, the refueling permissible number calculated in S3, the first period of time (or the first running distance) and the second period of time (or the second running distance) for each vehicle, calculated in S4 as described above (in addition, the refueling schedule after modification shown in FIG. 6 is one, for example, calculated or beforehand registered and in the case where the refueling permissible number every one hour is two, and indicates that a vehicle having a vehicle ID "10" suffices to go to the oil station R within not less than one hour but not more than two hours since a present point of time). More concretely, the running control unit 73 calculates how many times each vehicle 15 can run along the predetermined courses 7, 9 without refueling, on the basis of whether a period of time, during which operation is possible, is not less than the first period of time and shorter than the second period of time, or from information of operating time, the target running control information, the vehicle fuel consumption rate information, and so on, and modifies the original refueling schedule on the basis of results of the calculation. And the running control unit 73 transmits a refueling command (containing, for example, a command to run to the oil station R from a predetermined spot $P_w$ on the first course 7) to each vehicle 15 at an optional timing by radio on the basis of contents of the refueling schedule after modification. Thereby, each vehicle 15 automatically runs to the oil station R when it reaches the predetermined spot $P_w$ a predetermined number of times.

The embodiment has been described above. In addition, while the refueling schedule is made up in one hour unit in the example shown in FIG. 6, it is of course not limited to one hour unit but may be made up in, for example, second unit and/or minute unit.

According to the embodiment, since the refueling schedule is made up on the basis of production information, production planning information, oil station information, fuel consumption rate information, and so on, and the control center system 12 transmit a refueling command to each vehicle 15 on the basis of contents of the refueling schedule, a target production can be maintained as much as possible, and a wasteful waiting time is not generated, that is, refueling can be efficiently done because gas shortage is not caused and more vehicles than a predetermined number of vehicles are simultaneously present at the oil station R.

Here, the embodiment conceivably includes, for example, the following several separate modifications.

With a first separate modification, the running control unit 73 displays to an operator a graph of the refueling schedule shown in FIG. 6.

With a second separate modification, courses to the oil station R from the predetermined courses 7, 9 are not beforehand determined. With the second separate modification, the control center system 12 guides each vehicle 15 to the oil station R from optional spots on the predetermined courses 7, 9 in the following manner.

More specifically, registered in the database 13 are geographical data (for example, data containing coordinates of many spots in the predetermined range) in a predetermined range to contain course data of the predetermined courses 7, 9. And the running control unit 73 in the control center system 12 deduces when and where each vehicle 15 runs, from a present position of each vehicle 15 and the target running control information, calculates distances to the oil station R from respective spots on the predetermined courses 7, 9 on the basis of results of such deduction, a period of time, during which each vehicle 15 can operate, (or a running distance) calculated in S2 shown in FIG. 3, the refueling permissible number calculated in S3, the target running control information, and a fuel consumption rate of each vehicle 15, and further, referring also to results of such calculation, makes a calculation, for each vehicle 15, as to from which spot on the predetermined courses 7, 9 to the oil station R a course should be taken so that a residual quantity of a fuel reaches a predetermined residual quantity (for example, a little) around at the time of arrival at the oil station R (of course, the calculated spot eliminate simultaneous arrival of vehicles exceeding a predetermined number (for example, the refueling permissible number, or the number affording simultaneous refueling at the oil station R). Then the running control unit 73 transmits a refueling command at an optional timing by radio to a target vehicle 15 to have the same being off the course 7 or 9 at the respective spots (referred below to as "running modifying spot") calculated every vehicle 15 to go to the oil station R. Here, the transmitted refueling command includes, for example, positional information of the running modifying spot, data (for example, a plurality of coordinates, yaw, pitch, or the like contained in the guide course), obtained from geographical data, of a guide course for guiding from the running modifying spot to the oil station R, and the running control information (for example, speed information at respective spots) at the time of running on the guide course. Thereby, receiving the refueling command, the vehicle 15 can run to the oil station R on the basis of data of the guide course contained in the received refueling command and the running control information when it is detected by the position detection function of the vehicle that the vehicle has been to the running modifying spot.

With a third separate modification, in place of the target running control information being transmitted to the vehicles 15 from the control center system 12, the running control unit 73 in the control center system 12 identifies a region, into which each vehicle 15 will enter in the future, on the basis of present position information contained in the running state information of each vehicle 15 in the database 13, acquires the running control information for the identified region from the target running control information, and transmits to each vehicle 15 the running control information for the region.

With a fourth separate modification, the vehicles 15 may count periods of time, during which the vehicles 15 operate, or the vehicles 15 may forward respective points of time in running and the control center system 12 may calculate and control operating periods of time from transition of respective points of time in the running state information successively forwarded from the vehicles 15.

With a fifth separate modification, the control center system 12 may transfer to each vehicle 15 the running state information of all the vehicles 15A to 15F as collected and each vehicle 15 may make up its own refueling schedule in the same manner as in the running control unit 73 in for example, at least one of the embodiment and the first to fourth separate modifications. Alternatively, at least one vehicle 15 may store the same information as that in the database 13, in a storage device (for example, hard disk and so on) mounted in the vehicle to collect running state information from other vehicles, and the control unit 55 may make up its own refueling schedule in the same manner as in the running control unit 73. In the respective cases, for example, the control unit 55 of each vehicle 15 makes up its own refueling schedule on the basis of its own running state information and running state information and/or refueling schedules of other one or more vehicles 15 so that gas shortage is not caused in running of each vehicle and more vehicles 15 than a predetermined number of vehicles are not simultaneously refueled. Also, in this case, each of the plurality of vehicles 15 may cooperates with the other respective vehicles 15 to confirm contents of respective refueling schedules and adjust a refueling timing in its own refueling schedule in a time range, in which the vehicle is free from gas shortage, such that more vehicles than a predetermined number of vehicles are not simultaneously refueled.

While several preferred embodiments of the invention have been described above, they are exemplary for the purpose of illustration of the invention and not intended for limiting a scope of the invention thereto. The invention can be put into practice in other various embodiments. That is, while, for example, refueling has been described as an example of maintenance of vehicles in "the description of embodiments", the invention is not limited to refueling but applicable to scheduling of maintenance such as part replacement, service, or the like.

What is claimed is:

1. A maintenance scheduling apparatus for making up maintenance schedules for a plurality of vehicles, comprising:

detection means for detecting vehicle information including at least one of operating situations and vehicular states of the plurality of vehicles, the detection means detecting respective present positions and at least one of consumption and residual quantities of fuel of the plurality of vehicles, position storage means for storing positional information of maintenance locations where maintenance for the vehicles is done, and scheduling means for making up the maintenance schedules for the plurality of vehicles and determining whether respective vehicles of the plurality of vehicles have sufficient fuel for travel to respective maintenance locations based on the detected vehicle information, the positional information of the maintenance locations stored in the position storage mean, the detected present positions, and the at least one of detected consumption and residual quantities of fuel of the respective vehicles, where the maintenance schedules prevent more vehicles than a predetermined number of vehicles from being suspended in operation at the same time.

2. The maintenance scheduling apparatus according to claim 1, wherein the plurality of vehicles includes a first vehicle and a second vehicle, and the scheduling means makes up a maintenance schedule for the second vehicle on the basis of at least one of the following (1) and (2):

(1) at Least one of the operating situation and a vehicular state of the first vehicle, and (2) respective maintenance schedules of the first vehicle determined previously on the basis of (1) and at least one of an operating situation and a vehicular state of the second vehicle.

3. The maintenance scheduling apparatus according to claim 2, wherein the first vehicle is included in a first group of vehicle, and the scheduling means makes up a maintenance schedule for the second vehicle on the basis of at least one of the following (1) and (2):

(1) at least one of the operating situation and a vehicular state of the first group of vehicles, and (2) respective maintenance schedules of the first group of vehicles determined previously on the basis of (1) and at least one of an operating situation and a vehicular state of the second vehicle.

4. The maintenance scheduling apparatus according to claim 1, further comprising:

production storage means for storing production information representative of a relationship between operating information with respect to operation of at least one of the plurality of vehicles and production, and production planning information for said at least one of the plurality of vehicles, and wherein the scheduling means makes up the maintenance schedules based on the production information and the production planning information stored in the production storage means in addition to the detected vehicle information.

5. The maintenance scheduling apparatus according to claim 1, wherein the vehicle information includes target running control information.

6. The maintenance scheduling apparatus according to claim 1, wherein the detection means detects at least one of an operation period of time, running distance from a first point of time to a second point of time, and a weight of a load.

7. The maintenance scheduling apparatus according to claim 1, wherein the detection means detects at least one of vehicle fuel consumption rate information and oil station information.

8. A maintenance scheduling apparatus for making up maintenance schedules for a plurality of vehicles, comprising:

detection means for detecting vehicle information including at least one of operating situations and vehicular states of the plurality of vehicles, the detection means detecting respective present positions and at least one of consumption and residual quantities of fuel of the plurality of vehicles, position storage means for storing positional information of maintenance locations where maintenance for the vehicles is done, and scheduling means for making up the maintenance schedules for the plurality of vehicles an determining whether respective vehicles of the plurality of vehicles have sufficient fuel for travel to respective maintenance locations based on the detected vehicle information, the positional information of the maintenance location stored in the position storage means, the detected present positions, and the at least one of detected consumption and residual quantities of fuel of the respective vehicles, where the maintenance schedules maintains a predetermined number of vehicles in operation at the same time.

9. The maintenance scheduling apparatus according to claim 8, wherein the vehicle information includes target running control information.

10. The maintenance scheduling apparatus according to claim 8, wherein the detection means detect at least one of an operation period of time, running distance from a first point of time to a second point of time, and a weight of a load.

11. The maintenance scheduling apparatus according to claim 8, wherein the detection means detects at least one of vehicle fuel consumption rate information and oil station information.

* * * * *